No. 626,851.  
C. A. BEHLEN.  
THILL COUPLING.  
(Application filed Jan. 12, 1899.)  
Patented June 13, 1899.
(No Model.)
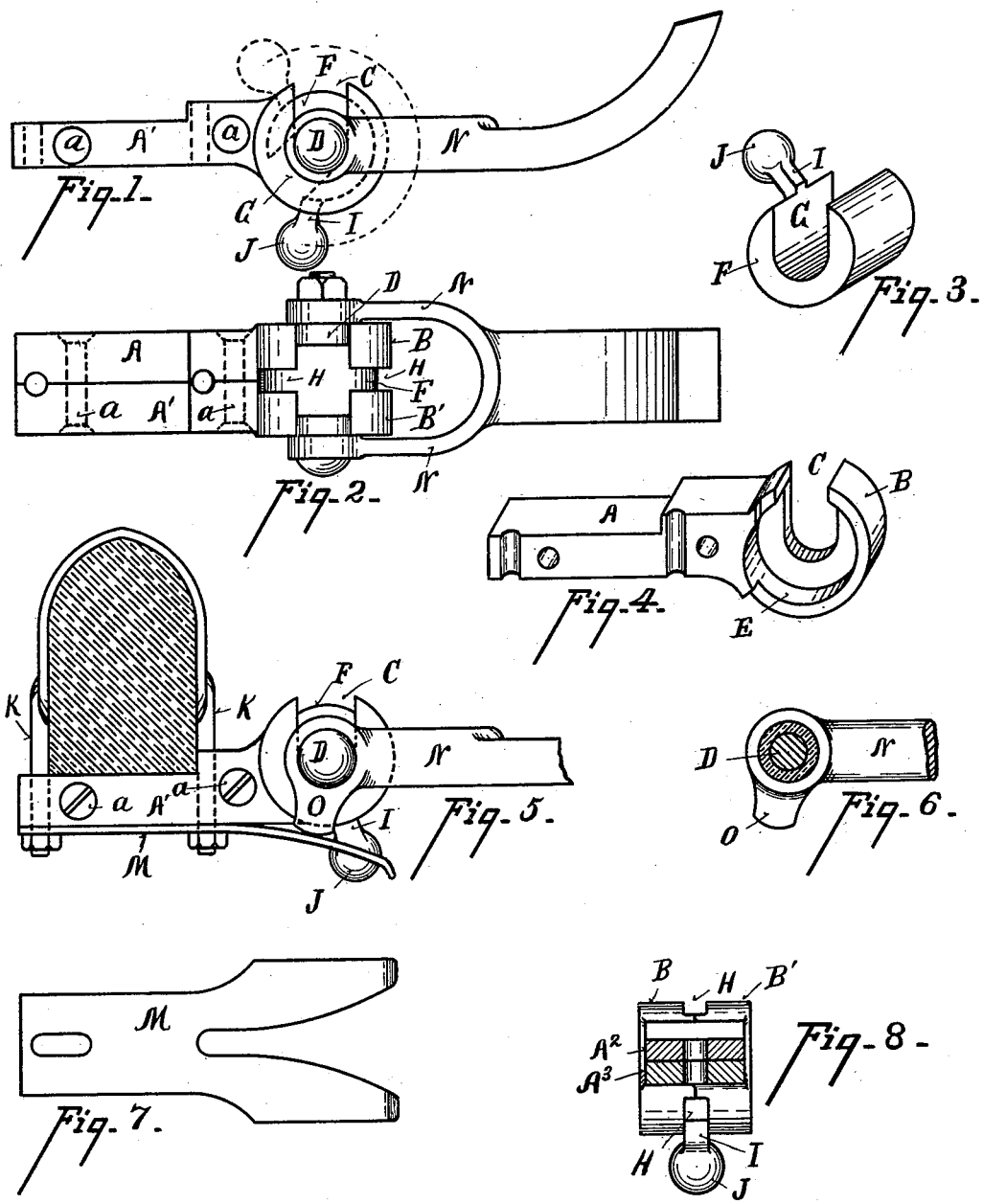
Witnesses  
C. W. Miles.  
Oliver B. Kaiser
Inventor  
Charles A. Behlen  
by Wood & Boyd  
Attorneys

UNITED STATES PATENT OFFICE.

CHARLES A. BEHLEN, OF CINCINNATI, OHIO.

THILL-COUPLING.

SPECIFICATION forming part of Letters Patent No. 626,851, dated June 13, 1899.

Application filed January 12, 1899. Serial No. 701,896. (No model.)

*To all whom it may concern:*

Be it known that I, CHARLES A. BEHLEN, residing at Cincinnati, in the county of Hamilton and State of Ohio, have invented certain new and useful Improvements in Thill-Couplings, of which the following is a specification.

My invention relates to a thill or shaft coupling for carriages.

The objects of my invention are, first, to provide a readily-detachable coupling; second, to provide an antirattling device, and, third, to provide a coupling which will be durable and not likely to produce lost motion by wear.

The features of my invention will be more fully set forth in the description of the accompanying drawings, making a part of this specification, in which—

Figure 1 is a side elevation of my invention. Fig. 2 is a top plan view thereof. Fig. 3 is a perspective view of the revoluble member detached. Fig. 4 is a perspective view of one of the duplex members of the coupling-bar. Fig. 5 is a side elevation of my improvement attached to an axle. Fig. 6 is a detached sectional view of one of the thill-forks and friction-lug. Fig. 7 is a plan view with the spring. Fig. 8 is a modification of the coupling-bar shown in Fig. 2.

The coupling-head constitutes a journal-box, which is adapted for various other coupling uses than thill-couplings.

In the preferred form of construction the coupling-bar is made of two members bisected on a vertical plane A A'. A² A³ represent the members of the corresponding coupling-bar. (Shown in Fig. 8.)

B B' represent the head of the coupling-bar, which is slotted at C on the top section, forming an entrance for the coupling-bolt D. The two sections of the bar A A' are secured together by screws or rivets *a*. These screw members of the coupling-bar are provided with an annular recess E. The coupling-box is made of two sections in order that the revoluble locking member can be inserted in its annular bearing-recess E. The sections of the coupling-box are placed upon each side of the revoluble member and secured by the rivets *a*. F represents the revoluble journal, which seats in said recess. It is provided with an entrance-slot G of the exact shape of the entrance-slot C of the stationary coupling member or head. The revoluble member F is journaled concentrically in the bearing of the head.

H represents an annular slot formed in the walls of the journal-box, preferably between the two sections, which annular slot intersects the transverse entrance-slot C. The revoluble member F is provided with a stem I, so as to allow it to enter the recess H at either side of the opening C. When the revoluble member is in the position shown by the dotted lines, Fig. 1, the opening G in the revoluble member is opposite and parallel with the planes of the opening C in the coupling-head. When in this position, the coupling-bolt D of the thill may be readily inserted or removed from the coupling. The journal-bolt is secured in position against detachability by turning the revoluble member F so that the head J of the stem occupies the position shown in Fig. 5. In this position both the stationary and the movable sections of the coupling form an annular journal for the thill-bolt.

In order to prevent rattling and take up lost motion, I provide the following instrumentalities:

K K represent the arm of the clip, which secures the shank of the coupling-bar to the axle. M represents a flat spring secured in position to said bar, the free end of which projects forward and preferably is forked, so as to receive the stem I of the revoluble member of the journal. N represents the forks of the thill-iron or shaft member. O represents the downward-projecting lug, preferably formed integral therewith. The opposite member of the fork has a counterpart lug. When the thills are in the horizontal position or thereabout, as shown in Fig. 5, the lugs O bear upon and depress the spring M. This takes up lost motion and prevents any rattling or noise. When the thills or coupling-irons N are turned upward to a vertical position, the lugs O move out of engagement with the spring. When the thills are dropped down to the ground, the lugs O move out of engagement in the opposite direction, so that they may be attached or detached from the coupling-bar at either of its extreme positions.

I have shown a modification in the method of bisecting the coupling-bar which is made for the purpose of introducing the revoluble member into the stationary member. In Fig. 8 I have shown this division made in horizontal instead of vertical planes. The preferred form of construction is to have the central member F revoluble and the outside member stationary. Of course the parts could be transposed without materially affecting the functions of the device; but the construction here shown is the neatest, cheapest, and best.

Having described my invention, what I claim is—

1. In a thill-coupling, a stationary coupling bar and head made of two sections having an annular recess forming the bearing and support for a revoluble member, and a vertical annular slot separating the jaw members, in combination with a revoluble member concentrically journaled in said annular recess, said members being provided with a slot opening into the bearing adapted to receive the coupling-bolt of the thill, substantially as specified.

2. In a thill-coupling, the combination of an annular slotted journal-box, an entrance-orifice formed therein, a revoluble locking member concentrically journaled in said box, and means for rotating said revoluble member into engagement with said annular slot to encompass the thill member, substantially as specified.

3. In a thill-coupling, the combination of an annularly-slotted journal-box, an entrance-orifice formed therein and transversely intersecting said annular slot, a revoluble locking member concentrically journaled in said box, a lug formed on said locking member adapted to be engaged with said slot, and a bifurcated spring attached to the box member and adapted to engage the thill-fork, substantially as specified.

4. In a thill-coupling, the combination of a journal-box, an entrance-opening formed therein, adapted to receive the thill member, annular slots formed in said box upon each side of the opening, a revoluble locking member concentrically journaled in said box, a lug formed on said member projecting through the entrance-opening and adapted to be moved into engagement with either of said annular slots, substantially as specified.

5. In a thill-coupling, the combination of a journal-box, transverse entrance-slot adapted to pass the thill member, annular locking-slots formed in the box adjacent to the transverse slot, a revoluble locking member concentrically journaled in said box, a lug formed on said revoluble member, projecting through said transverse slot and adapted to be brought into engagement with either of said annular slots, substantially as specified.

6. In a thill-coupling, the combination of a thill member and a coupling member, a journal-box formed in the end of the coupling member, a transverse entrance-slot formed in said box adapted to receive the thill journal-bolt, annular slots formed in said box adjacent to the transverse slot, a revoluble locking member concentrically journaled in said box, a transverse entrance-slot formed therein and adapted to register with the transverse journal-box slot, a lug formed on said revoluble member projecting through the transverse slot of the journal-box and adapted to be moved into engagement with either of said annular slots, lugs formed on the thill-forks, and a bifurcated spring attached to the coupling member adapted to bear against said lugs, substantially as specified.

7. In a thill-coupling, the combination of a journal-box, an entrance in said box adapted to receive the thill journal-bolt, annular locking-slots formed in the sides of the box adjacent to said entrance, a revoluble locking member concentrically journaled in said box, an entrance-orifice formed in said revoluble member, a lug projected from said revoluble member through the journal-box entrance, and adapted to be moved into interlocking relation with either of said annular slots, whereby said locking member may be rotated to bring either its entrance or its locking section across the journal-box entrance, substantially as specified.

8. In a thill-coupling, the combination of a journal-box, a revoluble member concentrically journaled therein, transverse entrance-slots formed therein, annular slots formed in the journal-box upon each side of the transverse slot, a lug projected from the revoluble member through the transverse box-slot, and adapted to engage either of said annular slots, whereby the journal may be opened and closed and locked in either position, substantially as specified.

9. In a thill-coupling, the combination of a journal-box, a revoluble member journaled concentrically therein, transverse entrance-slots formed in said members, annular locking-slots formed in the box member upon each side of the transverse slot, a lug projected from said revoluble member through the transverse box-slot, a spring attached to the coupling member adapted to rigidly engage the thill member, substantially as specified.

In testimony whereof I have hereunto set my hand.

CHARLES A. BEHLEN.

Witnesses:
OLIVER B. KAISER,
W. R. WOOD.